May 29, 1962 C. G. McDONOUGH 3,036,762
TRIP SPEED AVERAGER
Filed Feb. 24, 1958 4 Sheets-Sheet 1

INVENTOR
CLETUS G. McDONOUGH
by: H. H. Hulse
ATTY.

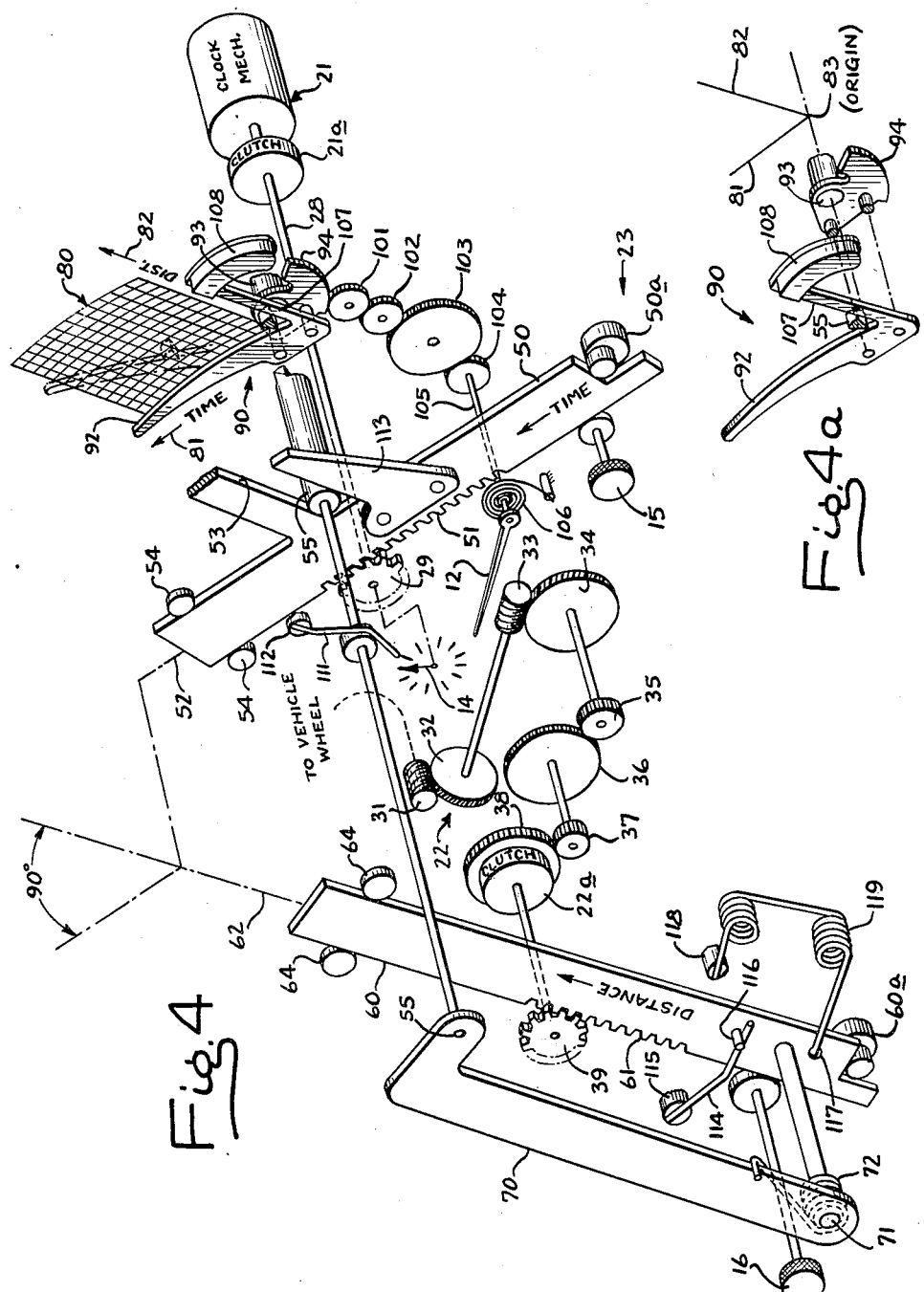

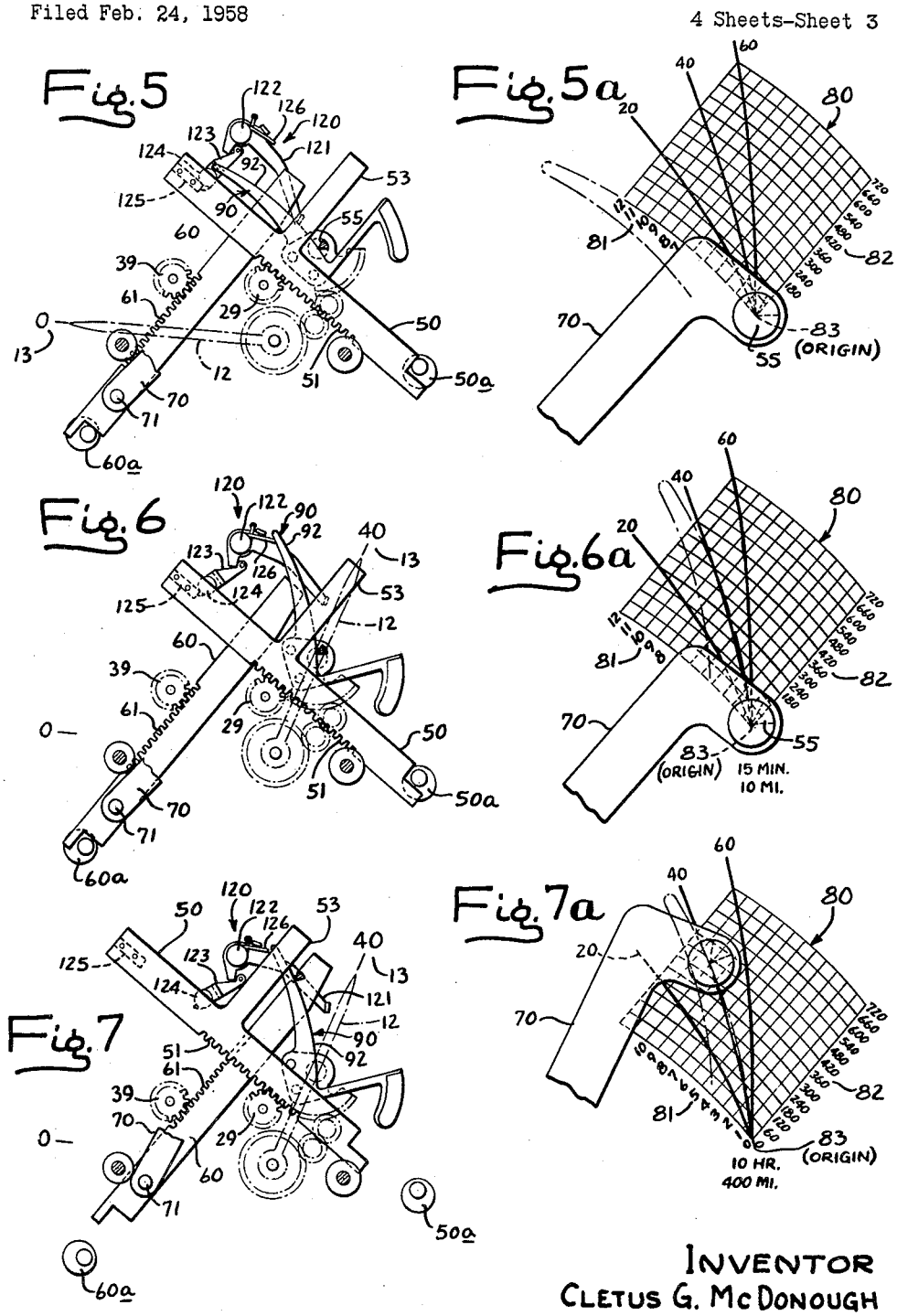

May 29, 1962

C. G. McDONOUGH 3,036,762

TRIP SPEED AVERAGER

Filed Feb. 24, 1958

INVENTOR
CLETUS G. McDONOUGH by: H. H. Hulse

ATTY.

United States Patent Office 3,036,762
Patented May 29, 1962

3,036,762
TRIP SPEED AVERAGER
Cletus G. McDonough, River Forest, Ill., assignor to General Time Corporation, New York, N.Y., a corporation of Delaware
Filed Feb. 24, 1958, Ser. No. 717,189
5 Claims. (Cl. 235—61)

The present invention relates to a speed averaging device and more particularly to a trip speed averager for use in an automotive vehicle.

A need has existed in the automotive field for many years for a device capable of continuously indicating the average speed over the distance which has been traversed. However, devices capable of continuously computing average speed have been, for the most part, too complex and costly and too delicate for use in an automobile. Moreover, such devices tend to be critical as regards lubrication and servicing and are susceptible to binding and other malfunctioning when neglected.

Accordingly, it is an object of the invention to provide an improved trip speed averager which is well suited to the requirements of automotive use. More specifically, it is an object to provide an averaging device which is inherently reliable under conditions of rough usage and free of any tendency toward binding or jamming even in the absence of periodic lubrication or maintenance. It is another object to provide an averaging device which has the required accuracy throughout a wide time and distance range and in which reliability and accuracy are preserved in the lower regions of such range. It is a related object to provide a trip speed averaging device in which means are employed for insuring that indicated scale readings can be depended upon, with a novel arrangement for disabling the indicator during the first few minutes or miles of travel.

It is a further object to provide a device of the above-type which is convenient to operate and which may be fully used by one having no instruction or knowledge of mechanical devices. It is a related object to provide an averaging device in which resetting of the mechanism to "zero" is easily accomplished and in which the indicator is positively restored to a "zero" position incident to such resetting.

Finally, it is an object of the invention to provide an averaging device which is capable of being used with conventional automotive clock mechanisms to form a compact integral instrument consisting of a minimum number of parts of a noncritical nature, easily manufactured and assembled, and susceptible of easy servicing when service becomes necessary.

Other objects and advantages become apparent upon reading the attached detailed description and upon reference to the drawings in which:

FIG. 4 is an exploded perspective of the mechanism shown in FIGS. 2 and 3, distorted to bring out the operative relationship between the parts and with the "distance" rack moved to a position adjacent to its associated pin arm.

FIG. 4a is an exploded view of the follower lever.

FIG. 5 is a stop motion diagram showing the relationship of the parts with the device reset to zero and with the indicator disabling latch operative.

FIG. 5a is a coordinate diagram with the follower lever in a position corresponding to that of FIG. 5.

FIG. 6 is similar to FIG. 5 but shows the positions of the elements after a few minutes of driving at an average rate of 40 miles per hour and with the disabling latch released.

FIG. 6a is a coordinate diagram corresponding to FIG. 6.

FIG. 7 shows the positions of the elements after driving at an average rate of 40 miles an hour for a period of ten hours.

FIG. 7a is a coordinate diagram corresponding to FIG. 7.

While my invention has been described primarily in connection with a preferred embodiment, it should be understood that I intend to cover the various alternative and equivalent constructions falling within the spirit and scope of the claims appended hereto.

Figure 1:
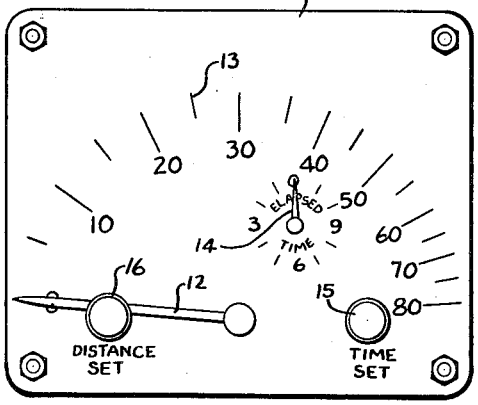
FIGURE 1 is a face view of a trip speed averaging device constructed in accordance with the present invention.

Turning to FIG. 1, in which a face view is shown, the trip speed averager 10 includes a dial 11 having a pointer or indicator 12 cooperating with a scale 13, the scale, in the present instance, being calibrated up to 80 miles per hour. To denote the elapsed time on the face of the instrument, an elapsed time pointer 14 is used, cooperating with the suitable hour scale. For the purpose of resetting the device to zero, a time resetting knob 15 is used together with a distance resetting knob 16. However, as will later appear, an alternative arrangement is disclosed in which the resetting function may be accomplished by a single control knob.

In use, the resetting knobs 15, 16 are turned back to zero which causes the pointers 12 and 14 both to be restored to the positions shown, thereby putting the device into operation. After an initial short delay of a minute or two, the reason for which will be later discussed, the pointer 12 will continuously and accurately indicate on the scale 13 the average speed which has been maintained by the vehicle over the traversed distance in spite of all possible variations in speed and regardless of the number or duration of any incidental stops for the purpose of refueling, meals, or the like.

Figure 3:
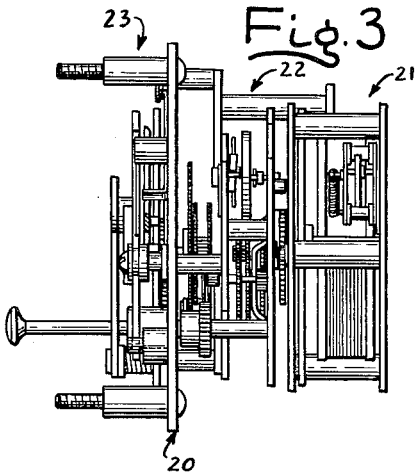
FIG. 3 is a side view, at reduced scale, of the mechanism showing in FIG. 2 with certain parts omitted for the sake of simplicity.
Figure 2:
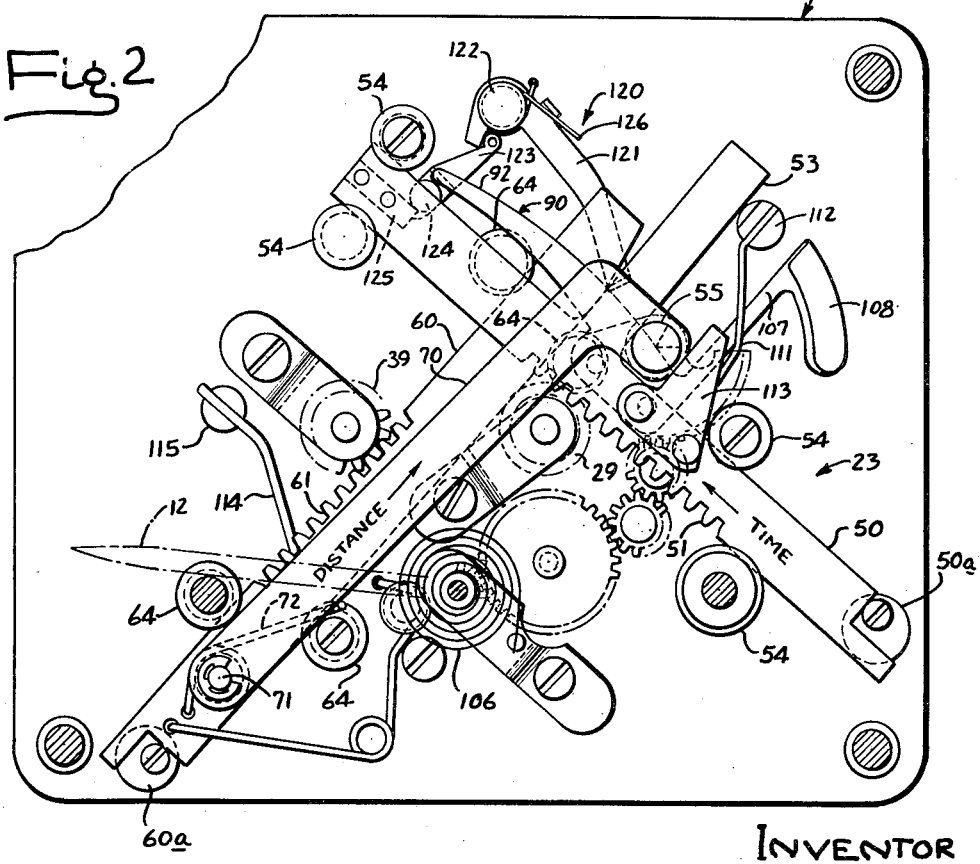
FIG. 2 is a front view of the device but with the dial removed to show the internal mechanism and with the pointer or indicator shown by the dot-dash outline.

Turning next to the mechanism shown in FIGS. 2, 3 and 4, the mechanism which I employ for accomplishing the above result may be readily understood. The device includes a frame 20 having a clock mechanism 21, a distance measuring mechanism 22, and a computing or dividing mechanism generally indicated at 23. The clock mechanism 21 has not been set forth in detail and may, for example, be of the type disclosed in Witte application Serial No. 659,912 filed May 17, 1957, now Patent No. 2,909,029. Extending from the clock mechanism 21 is an hour hand shaft 28 which terminates in an output element in the form of a pinion 29 which serves to drive a portion of the mechanism to be discussed. The hour hand shaft 28 is also coupled to the elapsed time indicator 14 (FIGS. 1 and 4).

Prior to discussing the mechanism driven by the time output pinion 29, it will be helpful to turn attention to the distance measuring mechanism 22 shown diagrammatically in FIG. 4. Here it will be noted that a worm 31, which is coupled to one of the wheels of the vehicle, through a standard flexible shaft is meshed with a worm wheel 32 to provide a first step of speed reduction. A second worm and worm wheel 33, 34, coupled thereto, provides a second stage of speed reduction. Further speed reduction is brought about by the pinion and gear elements 35, 36 and 37, 38, terminating in an output element in the form of a pinion 39. The complete reduction is on the order of 720,000 to 1.

In accordance with the present invention, first and second component members are provided coupled to the time and distance output elements 29, 39 for progressive movement at right angles from a point of origin for positioning of a coordinate pin along a resultant path of movement, with a lever pivoted at the point of origin being provided to sense the position of the pin for a direct indication of average speed. In the present embodiment the first component member is in the form of a rack 50 having rack teeth 51 which mesh with the pinion 29, movement of the rack being along a line 52. Preferably the rack 50 is L-shaped having a guide surface 53 which is substantially straight and which serves as a positioning abutment for a coordinate pin 55. It will be noted that the guide surface 53 is at right angles to the racks so that such surface retreats broadwise as the rack 50 moves longitudinally. The second component member is in the form of a rack 60 having rack teeth 61 meshing with the distance output pinion 39 for movement along a line 62. As shown, the racks are arranged overlappingly and at right angles to one another. The racks are guided along their paths of movement by guides 54, 64.

In order to move the pin 55 along the guide surface 53 in response to movement of the rack 60 while maintaining the pin in contact with the guide surface, a pin arm 70 is provided which is mounted on, and arranged generally parallel to, the rack 60. The pin arm includes a pivot 71 at its lower end and mounts the coordinate pin 55 at its upper end. Thus, the pin is constrained for movement substantially normal to the surface 53 as the latter retreats. A biasing or tension spring 72 is connected between the pin arm 70 and the rack 60 in order to bias the pin arm in a counter clockwise direction and toward the guide surface.

In order to more graphically illustrate the manner in which the parts cooperate with one another it will be noted that in FIG. 4 the distance rack 60 is shown at the left hand side of the mechanism closely adjacent the pin arm 70 which is secured to it. In the actual construction and as brought out in the remaining figures, the distance rack is located at the right hand side of the mechanism and clear of the end of the pin 55 so that the pin 55 is free to move in the "time" direction free of obstruction.

It will be apparent from what has been said thus far that both of the racks 50, 60 act upon the coordinate pin 55 to advance the pin along two components of movement at right angles to one another. In order to show geometrically the resultant movement of the pin 55, a graph 80 has been included in FIG. 4 having a time coordinate 81 and a distance coordinate 82. Movement of the pin starts from a point of origin 83, the position of which is determined by suitable stops 50a, 60a, associated with the racks 50, 60. These stops are in the form of eccentrics which may be conveniently adjusted to determine the starting positions of the racks and therefore of the pin 55. Upon movement of the time rack through a distance "x" and the distance rack through a distance "y," it will be apparent that the pin 55 will move along a resultant path to a position shown dotted at 55a.

In carrying out the present invention, a follower lever is provided pivoted at the origin for following the position of the pin 55, and with the follower lever being rotatably coupled to an indicator calibrated directly in terms of speed. In the present instance the follower lever 90 has an upwardly extending arm 91 having a contact surface 92 thereon which passes through the pivot axis 93. To rotatably couple the follower lever 90 to the indicating pointer 12, the follower lever is provided with a circular rack 94 spaced from, but integral with, the arm 92 (see FIG. 4a). This rack comprises the input for a gear train consisting of the gears 101–104 terminating in the shaft 105 which mounts the pointer 12. It will be apparent that because of this coupling, the angular position or "slope" of the follower lever 90 is at all times indicated by the position of the indicator hand 12 relative to the scale 13 which is calibrated directly in terms of speed.

By suitable adjustment of the stops 50a, 60a, referred to, the starting position of the pin 55 is caused to coincide with the pivot 93 of the follower lever. In order to make this relationship exact, the end of the pin 55 is preferably formed into wedge shape, this providing a sharp knife edge. The latter is effective throughout the range of swinging movement of the follower lever.

For the purpose of maintaining the surface 92 of the follower lever 90 against the pin 55, biasing means are provided in the form of a hair spring 106, the latter being connected to the pointer shaft. Moreover, the follower lever 90 includes an arm or extension 107 carrying a counterweight 108 thereon. One advantage of using the counterweight, instead of simply increasing the stiffness of the hair spring 106, is that the biasing force provided by the weight 108 is small in the region of the origin and becomes progressively greater as the pin 55 progresses along the distance axis 82.

While the biasing force provided by the hair spring 106 and counterweight 108 is small, nevertheless it will be appreciated that when the pin 55 is in the region of the origin the mechanical advantage is great and the pressure exerted by the follower lever 90 upon the pin 55 is accordingly relatively high. Consequently, auxiliary means are provided for assisting the racks to undergo initial movement in response to turning of the pinions 29, 39 which drive them. In the case of the rack 50, assistance is provided for a limited range by means of the cantilever spring 111 which is anchored at 112 and which bears against the pin 55, thereby tending to push the rack along the direction of the line 52. Moreover, in order to prevent the guide surface 53 on the rack 50 from pulling away from the pin 55 under conditions of small displacement of the pin from the origin, the rack 50 is provided with an assist plate 113 which is riveted or otherwise secured thereto and which, together with the guide surface 53, provides a slot in which the pin 55 is, during its initial movement, held captive. Similarly, to assist the distance rack 60 to move the pin 55 under low displacement conditions, a cantilever spring 114 is provided having an anchorage 115 and pressing against a projection or post 116 mounted on the rack 60. Additional upward bias is provided throughout the range of movement of the rack 60 by means of an auxiliary spring 119, one end of which is received in an opening 117 formed in the rack and the other end of which is anchored at 118.

It will be apparent to one skilled in the art that when the knife edge of the pin 55 is aligned with axis of the follower lever 90, as it is under starting conditions, the angular position of the follower lever and hence the position of the indicating pointer 12, is indeterminate. Consequently, in accordance with one of the aspects of the invention, auxiliary latching and positioning means are provided for disabling the pointer 12 by maintaining it in a zero or non-reading position until such time as the pin 55 moves away from the origin by predetermined amount. The function of the latching and positioning means may be most readily understood by reference to the diagrams set forth in FIGS. 5 to 7 and the accompanying figures designated by a letter subscript. Briefly, FIG. 5 shows the positions of the significant elements as they exist at the start, with the indicating pointer latched in the non-reading or zero position. FIG. 6 shows the members after a few minutes have elapsed, during which the vehicle has proceeded at an average speed of 40 m.p.h. FIG. 7 shows the positions of the elements after ten hours have elapsed, it being assumed, for the sake of example, that the average speed has been 40 m.p.h. over such period.

In order to cause the racks to be restored to their starting positions shown in FIG. 5, the resetting knobs 15 and 16 (FIG. 1) are frictionally coupled to the racks by means of friction discs 15a, 16a, respectively. The knobs 15 and 16 are simply turned clockwise until resistance is felt, indicating that the racks have bottomed on their respective stops 50a, 60a. Movement of the racks is permitted without accompanying movement of the gear trains which drive them by reason of friction clutches 21a, 22a incorporated in such gear trains (FIG. 4). The latter may be of the type commonly used in clocks to permit manual overpowering during the setting operation.

In the present instance the latching and positioning mechanism indicated at 120 includes a latching lever 121 pivoted at 122 and an operating lever 123 pivoted at 124. For rotating the operating lever 123 counterclockwise incident to resetting the rack 50, an abutment 125 is provided at the upper end of the rack. Thus, when the rack is reset the operating lever 123 rotates counterclockwise, imparting clockwise rotation to the lever 121 against the force of the biasing spring 126 on the latter, causing the end of the latch lever 121 to rotate down against the surface 92 on the follower lever 90. As a result, the follower lever 90 moves counterclockwise against its force of bias until the tip thereof strikes a stop which, in the present instance, is in the form of the upper end of the pivot 124, thereby causing the indicating pointer 12 to be rotated around to the zero position shown.

After a few minutes have elapsed the rack 50 has moved upwardly as shown in FIG. 6, thereby retracting the abutment 125 thereon from the operating lever 123 and freeing the latch lever 121 so that it may pivot upwardly to an out-of-the-way position under the influence of its biasing spring 126. The frees the follower arm 90 so that it may rotate around into engagement with pin 55. Assuming that the vehicle has traveled at an average speed of 40 m.p.h. in the interval between the condition of FIGS. 5 and 6, the follower lever 90 will occupy a position shown in FIG. 6a corresponding to a pointer position of 40 m.p.h.

In accordance with one of the aspects of the present invention, the engaging surface 92 of the follower lever 90 is not straight but is convexly curved so that the reading of the indicator pointer will remain constant upon movement of the pin 55 during constant speed conditions. The importance of this becomes clear when it is considered that the coordinates of position are not rectangular but rather curved along one direction because of the fact that the pin 55 is mounted at the end of the swingable pin arm 70. Consequently, as the pin 55 is urged along one component of movement by movement of the time rack 50 it does not follow a straight line but rather a line having a radius of curvature which is equal to the length of the pin arm 70. As a result of this, the loci of the constant speed lines, of which three have been shown as 20, 40, 60 in FIGS. 6a and 7a are not straight but are curved as shown. Note that in these figures the curvature of the face 92 on the arm 90 substantially coincides with the curvature of the 40 m.p.h. locus. The curvature also coincides within reasonable limits of accuracy with all of the other loci within the operating range. Thus as an average speed of say, 40 m.p.h. is maintained, the pin 55 will follow the locus without producing any change in the position of the follower lever 90 or the pointer 12 which is connected to it. Turning to FIG. 7a, which shows the condition approximately ten hours after that shown in FIG. 6a, the pin 55 has advanced substantially along the 40 m.p.h. constant speed locus without causing the pointer 12 to deviate from its reading.

Experience with the present device has shown that the present arrangement in which the coordinate pin 55 is mounted at the end of a swingable pin arm, inherently avoids any tendency for the pin to bind or to jam, even when the device is neglected over long periods of time and deprived of lubrication. The inherent reliability may be best appreciated by comparing the present arrangement with a more rudimentary scheme employing two guide surfaces similar to the guide surface 53 advancing at right angles to one another and both urgingly acting upon the same coordinate pin 55. Under such conditions, simultaneous movement of the two component members or racks tends to cause coordinate pin 55 to be pinched, i.e. bind, particularly in absence of lubrication. Such pinching or binding would, of course, make the device inoperative. In the present device, movement of the time rack 50 upon passage of time simply causes the guide surface 53 to tend to retreat from the pin 55, with follow-up movement of the pin being brought about by the torsion spring 72 and with corresponding movement of the follower lever 90. Similarly, movement of the distance rack 60 simply causes the pin 55 to be guided along the smooth surface 53, again with corresponding followup movement of the follower lever 90. Moreover, both of these movements make take place at the same time without any binding tendency since the pin is required to slide with respect to one component member, not two.

The above applies over substantially the entire range of movement of the pin 55, for example, over the elapsed time of 12 hours and a traversed distance of 720 miles. The only exception of this is when the pin 55 is at the origin 83 and aligned with the pivot of the follower arm 90 as it is during the first few minutes of travel and during which time, as stated, the mechanical advantage of the torque exerted by the hair spring 106 is high. But, as we have seen in connection with FIGS. 5 and 6, latching and positioning means 120 are provided for maintaining the follower lever out of contact with respect to the pin 55 until the pin 55 has moved away from the origin by a predetermined amount. In short, the present device provides a high degree of reliability over the entire operating cycle, even under the adverse conditions of use found in the average automobile and the reading can, at all times, be depended upon.

Figure 8:
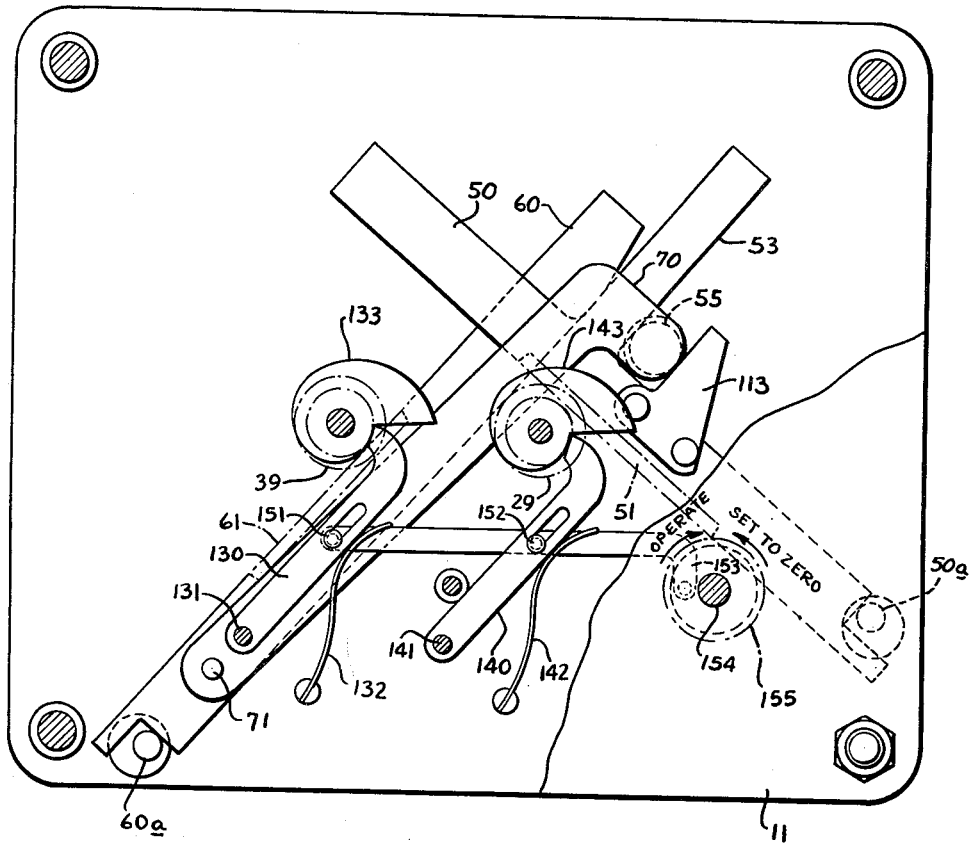
FIG. 8 shows, in diagrammatic form, a modified form of resetting mechanism employing a single resetting knob and in the "zero-reset" position.

While separate resetting knobs 15, 16 have been disclosed in the embodiment described above, for the sake of simplicity my invention contemplates, in one of its aspects, the provision of a single resetting mechanism operating simultaneously upon both the time and distance racks. One arrangement for accomplishing this is shown in FIG. 8 in which spring pressed restoring means are used to urge the rack members to their start positions with a manual control member movable between a "zero set" position, in which the spring pressed restoring means are free to act, and an "operate" position, in which the restoring means are retracted into an out-of-the-way position. In the present embodiment the spring pressed restoring means for the rack 60 comprises a reset lever 130 pivoted at 131, and biased by a spring 132 into contact with a resetting cam 133 which is coupled to the pinion 39. The cam will be recognized as a "snail" cam which rotates in response to a radially applied force to drive the connected element, in this case the pinion 39, to a reference or starting position. This starting position is illustrated in FIG. 8, the rack 50 being bottomed against its stop 50a. For the purpose of restoring the distance rack 50 to its starting position, a similar reset lever 140 is used, pivoted at 141, and having a biasing spring 142 for operating upon a "snail" cam 143, the latter being coupled to the pinion 29.

It will be understood that the strength of the springs 132, 142 and the slope of the cams 133, 143 is sufficient to provide enough mechanical advantage to rotate the respective pinions in their reverse directions in spite of the friction provided by the associated clutches (21a and 22a in FIG. 4) and the incidental friction in the system.

In order to retract both of the resetting levers 130, 140 to an out-of-the-way position after the zero setting operation, a link 150 is used which extends horizontally within the mechanism and which is pivoted to the reset levers at pivots 151, 152. Such pivots preferably provide a small amount of lost motion so that each of the two levers is free to assume a completely bottomed position relative to its associated cam. In order to draw the link 150 endwise, a crank 153 is provided connected to a resetting shaft 154 which terminates in a manual zero-setting knob 155.

Figure 8A:
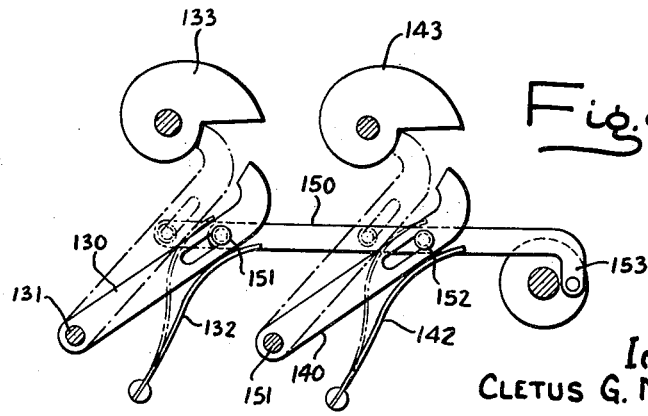
FIG. 8a is a fragmentary view showing the significant elements of FIG. 8 under operating conditions.

In operation, the setting knob 155 is rotated counterclockwise into the "zero set" position. This releases the resetting arms so that they may, under the urging of their springs, press downwardly against their associated cams to restore the racks to the position shown in FIG. 8. This causes both of the pointers to be restored to zero. After the zero setting has been accomplished, the knob is then rotated clockwise into the "operate" position which is effective to retract the arms into the position shown in FIG. 8a. Thereafter the time and distance mechanisms may "take over" to advance the two racks just as described in the earlier discussion of the mechanism.

While the invention has been described in connection with an automotive speed averager, it will be apparent that my invention in its broader aspects is not limited to averaging of vehicle speed but may be employed for other purposes. For example, the device may be coupled to a rotating electrical machine or the like and calibrated in terms of average r.p.m. instead of average m.p.h. Analogous uses will occur to one skilled in the art. Consequently, the term "distance" as used in the claims, may be interpreted to include revolutions or "angular distance."

It will be apparent that the device may be manufactured and assembled inexpensively, employing non-precision parts of the type generally employed in clocks, and while the device is, judging by the results, a precision computing device, nevertheless it may be manufactured and sold cheaply enough to warrant its inclusion in the average automobile.

I claim as my invention:

1. In a trip speed averager for use in automotive vehicle or the like, the combination comprising a clock mechanism having an output element, a distance measuring mechanism having an output element, first and second movable members arranged side by side at right angles to one another and in engagement with said output elements for movement from respective starting positions, a pin arm pivoted at one end to one of the movable members and having a pin at its other end, means for coupling the pin to the other of said movable members so that upon simultaneous movement thereof the pin is moved along a resultant path from a starting position, a follower lever pivoted on an axis alined with the starting position of said pin and in following engagement with said pin so that the angular position of said follower lever denotes the geometric slope of the coordinate position of said pin, and a visual indicator coupled to said follower lever and calibrated directly in terms of speed for denoting the average speed of the vehicle from the time that the pin starts moving from its starting position.

2. In a trip speed averager for use in an automotive vehicle or the like, the combination comprising a clock mechanism having an output pinion, a distance measuring mechanism having an output pinion, a first rack and a second rack arranged at right angles to one another and in mesh with said pinions respectively, the first rack being L shaped and having a guide surface extending parallel to said second rack, a pin arm mounted on said second rack, said pin arm being pivoted to said second rack at one end and having a pin at its other end, means for biasing the pin arm so that the pin remains in engagement with said guide surface and moves along a resultant path from a point of origin upon movement of said rack members, a follower lever pivoted at said point of origin and biased into engagement with said pin so that the angular position of said follower lever denotes the geometric slope of the coordinate position of said pin, and a visual indicator coupled to said follower lever and calibrated directly in terms of speed for denoting the average speed of the vehicle from the time that the pin starts moving from said point of origin.

3. In a trip speed averager for use in an automotive vehicle or the like, the combination comprising, a clock mechanism having an output element, a distance measuring mechanism having an output element, a first component member having a substantially straight guide surface and coupled to one of said output elements for movement therewith broadwise from a starting position, a second component member having a coordinate pin coupled to the remaining output element for movement from a starting position so that the coordinate pin moves along said guide surface progressively from a point of origin, a follower lever pivoted at the point of origin and biased into engagement with said coordinate pin, an indicator coupled to said follower lever and calibrated directly in terms of average speed, and latch means coupled to one of said output elements for maintaining said follower lever retracted against the force of bias so that the indicator is maintained in a non-reading position when said coordinate pin is in the immediate vicinity of the origin, said latch means including means for releasing the same following predetermined movement of the output element.

4. In a trip speed averager for use in an automotive vehicle or the like, the combination comprising a clock mechanism having an output element, a distance measuring mechanism having an output element, a first movable component member coupled to one of said output elements for movement therewith from a point of origin and having a guide surface which is arranged generally perpendicular to the direction of movement, a second component member having a coordinate pin and coupled to the remaining output element for movement parallel to the guide surface so that the coordinate pin moves along said guide surface from said point of origin upon movement of said remaining output element, a follower lever pivoted at said origin and biased to engage said pin, a visual indicator coupled to said follower lever and calibrated directly in terms of average speed, and latch means coupled to at least one of said component members for maintaining said indicator in disabled non-reading position until said coordinate pin moves from the immediate vicinity of the point of origin.

5. In a trip speed averager for use in an automotive vehicle or the like, the combination comprising a clock mechanism having an output element, a distance measuring mechanism having an output element, a first movable component member coupled to one of said output elements for movement therewith from a point of origin and having a guide surface which is generally perpendicular to the direction of movement, a second movable component member in the form of a swingable arm having a pivot at one end and carrying a coordinate pin at the other, with the pivot being so positioned that the pin is constrained for movement substantially normal to the guide surface upon swinging of said arm, the pivot of said arm being coupled to the remaining output element for translational movement along a line parallel to the guide surface so that the coordinate pin moves along said guide surface from said point of origin upon movement of said remaining output element, a follower lever pivoted at the point of origin and calibrated in terms of average speed, said follower lever having a curved pin-engaging surface so that said indicator indicates a constant average speed upon movement of said coordinate pin along a locus defining a constant ratio between traversed distance and elapsed time.

References Cited in the file of this patent

UNITED STATES PATENTS

| | | |
|---|---|---|
| 483,946 | Roberts | Oct. 4, 1892 |
| 864,379 | Junghans | Aug. 27, 1907 |
| 1,343,198 | Eaton | June 15, 1920 |
| 1,895,347 | Solomon | Jan. 24, 1933 |
| 2,527,661 | Stack | Oct. 31, 1950 |
| 2,620,975 | Nardone | Dec. 9, 1952 |
| 2,723,081 | Miller | Nov. 8, 1955 |
| 2,796,830 | Hilton | June 25, 1957 |

FOREIGN PATENTS

| | | |
|---|---|---|
| 648,384 | France | Aug. 13, 1928 |
| 910,480 | Germany | May 3, 1952 |